(No Model.)
J. K. JESSUP & F. W. & J. W. WICKHAM.
TREE PROTECTOR.
No. 600,645. Patented Mar. 15, 1898.
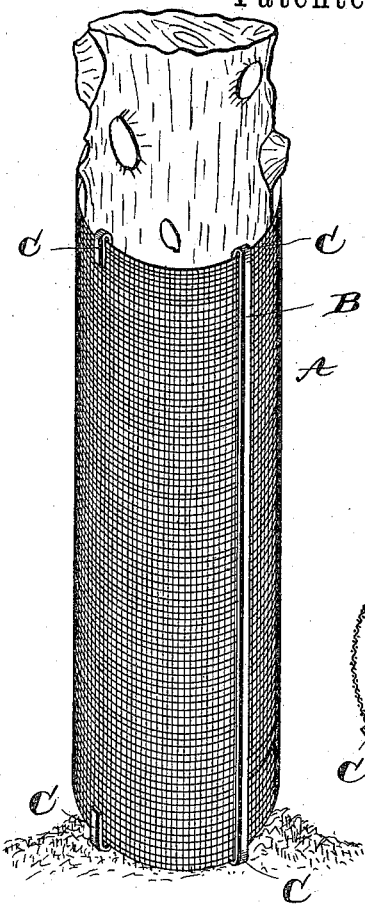
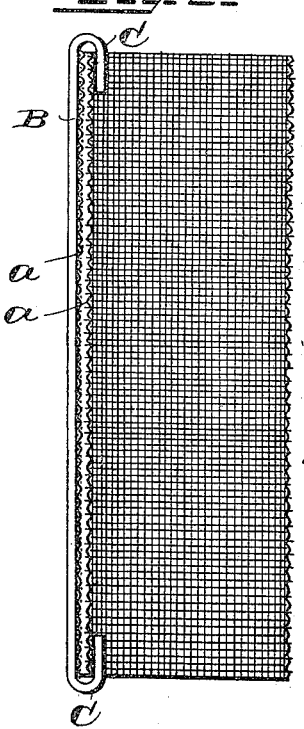
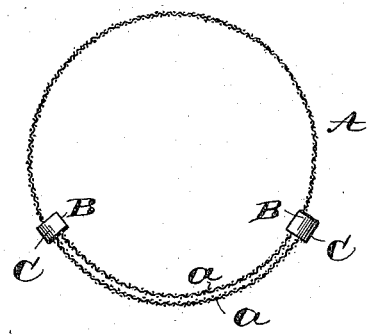
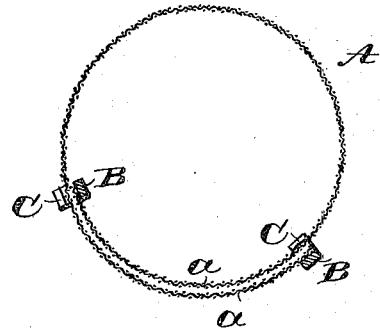
Witnesses
G. A. Tauberschmidt
G. C. Shinn
Inventors
John K. Jessup
Frank W. Wickham
James W. Wickham
By Edwd. J. Underwood
Attorney

UNITED STATES PATENT OFFICE.

JOHN K. JESSUP, FRANK W. WICKHAM, AND JAMES W. WICKHAM, OF MOUND CITY, KANSAS.

TREE-PROTECTOR.

SPECIFICATION forming part of Letters Patent No. 600,645, dated March 15, 1898.

Application filed May 7, 1897. Serial No. 635,461. (No model.)

*To all whom it may concern:*

Be it known that we, JOHN K. JESSUP, FRANK W. WICKHAM, and JAMES W. WICKHAM, citizens of the United States, residing at Mound City, in the county of Linn and State of Kansas, have invented certain new and useful Improvements in Tree-Protectors; and we do hereby declare the following to be a full, clear, and exact description of the invention, such as will enable others skilled in the art to which it appertains to make and use the same.

Our invention relates to certain new and useful improvements in tree-protectors; and it consists in the peculiar construction, arrangement, and combination of the parts, as will be hereinafter described in the specification, illustrated in the drawings, and pointed out in the claim.

The object of our said invention is to produce a durable tree-protector which shall secure trees from the attacks of insects, borers, rabbits and other animals, as well as from the heat of the sun, and at the same time be capable of automatically expanding as the tree increases in size, so that the protector is held closely to the tree at all stages of its growth, but can never cut into the bark.

In the accompanying drawings, which fully illustrate our invention, Figure 1 is a perspective view showing our invention applied to a tree. Fig. 2 is a vertical section. Fig. 3 is a top plan view, and Fig. 4 is a cross-section.

Like letters of reference indicate like parts in all the figures.

In constructing our tree-protector we employ a wire-netting or sheet of thin flexible material A, bent into the form of a cylinder, the edges considerably overlapping, and having secured at each edge a vertical bar B, having their ends bent into loops or hooks C, which each pass over the overlapped upper and lower edges *a* of the cylinder A at top and bottom, but in opposite directions, and the resiliency of the cylinder will hold it closely to the tree; but as the trunk of the tree enlarges in growth the cylinder will automatically expand in accordance with said growth, but always be held closely to the bark, thus forming a perfect protection at all stages of growth. As thus constructed and with the lower end of the cylinder resting upon the ground our tree-protector affords a certain protection not only from insects, such as borers, and from the attacks of small animals, but from horses, cattle, and sheep and from sun-blasts, and will adapt itself to trees of all sizes, and also will allow expansion at one end without change at the other.

We are aware that elastic tarred paper has been employed as a protection for trees; but this is perishable and even invites the attacks of horses and cattle, and, moreover, it soon becomes so worn and rotten as to lose its purpose. So, also, cylinders of wire-gauze have been employed; but the means of attachment have been so cumbersome that the protectors have failed to automatically adapt themselves to the changing sizes of the trees desired to be protected.

In practice the protector is placed around the tree, its lower edge resting on the ground, and the loops or hooks upon the vertical bars are bent or passed around the overlapped edges of the cylinder loosely, which holds the cylinder closely to the tree, and as the trunk enlarges in its growth the protector will expand in accordance therewith, but always closely encircle the tree and do no injury to its bark.

Having thus fully described our invention, what we claim as new therein, and desire to secure by Letters Patent, is—

In a tree-protector the combination of a flexible cylinder, composed of wire-netting, having overlapping edges and having secured at each vertical edge a metal bar provided with ends bent into hooks or loops arranged to pass over the overlapped upper and lower edges of the cylinder in opposite directions, and securing the said edges together, all substantially as hereinbefore described.

In testimony whereof we affix our signatures in presence of two witnesses.

JOHN K. JESSUP.
FRANK W. WICKHAM.
JAMES W. WICKHAM.

Witnesses:
N. W. CAMPBELL,
J. O. MORSE.